(12) United States Patent
Keegan

(10) Patent No.: US 6,509,113 B2
(45) Date of Patent: Jan. 21, 2003

(54) FLUID DISTRIBUTION SURFACE FOR SOLID OXIDE FUEL CELLS

(75) Inventor: Kevin R. Keegan, Hilton, NY (US)

(73) Assignee: Delphi Technologies, Inc., Troy, MI (US)

( * ) Notice: Subject to any disclaimer, the term of this patent is extended or adjusted under 35 U.S.C. 154(b) by 110 days.

(21) Appl. No.: 09/738,700

(22) Filed: Dec. 15, 2000

(65) Prior Publication Data

US 2002/0076600 A1 Jun. 20, 2002

(51) Int. Cl.$^7$ .............................. H01M 8/10; C25B 9/00; B01D 63/00
(52) U.S. Cl. .............................. 429/30; 429/38; 429/34; 204/275.1; 210/321.81
(58) Field of Search .............................. 429/34, 38, 39, 429/30; 204/252, 257, 263, 269, 275.1; 210/321.64, 321.72, 321.75, 321.81

(56) References Cited

U.S. PATENT DOCUMENTS

| | | | | |
|---|---|---|---|---|
| 4,065,375 A | * | 12/1977 | Newton | ...................... 204/237 |
| 4,589,968 A | * | 5/1986 | Toomey, Jr. | ................. 204/257 |
| 6,171,374 B1 | * | 1/2001 | Barton et al. | .......... 210/321.75 |
| 2001/0041281 A1 | * | 11/2001 | Wilkinson et al. | ............ 429/34 |

* cited by examiner

Primary Examiner—Stephen Kalafut
Assistant Examiner—R. Alejandro
(74) Attorney, Agent, or Firm—Vincent A. Cichosz

(57) ABSTRACT

The drawbacks and disadvantages of the prior art are overcome by an electrode fluid distributor. The electrode fluid distributor comprises a fluid passageway having a first end with an inlet and a second end with an outlet. A baffle is included that diagonally traverses the fluid passageway from the first end to the second end, and from a base of the fluid passageway toward an at least partially open side of the fluid passageway. The baffle defines at least a portion of a first reservoir and at least a portion of a second reservoir, with the inlet defining at least a portion of one end of the first reservoir and the outlet defining at least a portion of one end of the second reservoir. The inlet is in fluid communication with the outlet over the baffle. The first reservoir has a width proximate the open side which is smaller proximate the inlet than proximate the outlet.

18 Claims, 4 Drawing Sheets

US 6,509,113 B2

FLUID DISTRIBUTION SURFACE FOR SOLID OXIDE FUEL CELLS

TECHNICAL FIELD

The present disclosure relates to solid oxide fuel cells, and more particularly relates to a solid oxide fuel cell structure including a fluid distribution system.

BACKGROUND

Alternative transportation fuels have been represented as enablers to reduce toxic emissions in comparison to those generated by conventional fuels. At the same time, tighter emission standards and significant innovation in catalyst formulations and engine controls have led to dramatic improvements in the low emission performance and robustness of gasoline and diesel engine systems. This has certainly reduced the environmental differential between optimized conventional and alternative fuel vehicle systems. However, many technical challenges remain to make the conventionally fueled internal combustion engine a nearly zero emission system having the efficiency necessary to make the vehicle commercially viable.

Alternative fuels cover a wide spectrum of potential environmental benefits, ranging from incremental toxic and carbon dioxide ($CO_2$) emission improvements (reformulated gasoline, alcohols, liquid petroleum gas, etc.) to significant toxic and $CO_2$ emission improvements (natural gas, dimethylether, etc.). Hydrogen is clearly the ultimate environmental fuel, with potential as a nearly emission free internal combustion engine fuel (including $CO_2$ if it comes from a non-fossil source). Unfortunately, the market-based economics of alternative fuels, or new power train systems, are uncertain in the short to mid-term.

The automotive industry has made very significant progress in reducing automotive emissions in both the mandated test procedures and the "real world". This has resulted in some added cost and complexity of engine management systems, yet those costs are offset by other advantages of computer controls: increased power density, fuel efficiency, drivability, reliability and real-time diagnostics.

Future initiatives to require zero emission vehicles appear to be taking us into a new regulatory paradigm where asymptotically smaller environmental benefits come at a very large incremental cost. Yet, even an "ultra low emission" certified vehicle can emit high emissions in limited extreme ambient and operating conditions or with failed or degraded components.

One approach to addressing the issue of emissions is the employment of fuel cells, particularly solid oxide fuel cells ("SOFC"), in an automobile. A fuel cell is an energy conversion device that generates electricity and heat by electrochemically combining a gaseous fuel, such as hydrogen, carbon monoxide, or a hydrocarbon, and an oxidant, such as air or oxygen, across an ion-conducting electrolyte. The fuel cell converts chemical energy into electrical energy. A fuel cell generally consists of two electrodes positioned on opposites of an electrolyte. The oxidant passes over the oxygen electrode (cathode) while the fuel passes over the fuel electrode (anode), generating electricity, water, and heat.

SOFCs are constructed entirely of solid-state materials, utilizing an ion conductive oxide ceramic as the electrolyte. A conventional electrochemical cell in a SOFC is comprised of an anode and a cathode with an electrolyte disposed therebetween. In a typical SOFC, a fuel flows to the anode where it is oxidized by oxygen ions from the electrolyte, producing electrons that are released to the external circuit, and mostly water and carbon dioxide are removed in the fuel flow stream. At the cathode, the oxidant accepts electrons from the external circuit to form oxygen ions. The oxygen ions migrate across the electrolyte to the anode. The flow of electrons through the external circuit provides for consumable or storable electricity. However, each individual electrochemical cell generates a relatively small voltage. Higher voltages are attained by electrically connecting a plurality of electrochemical cells in series to form a stack.

The SOFC cell stack also includes conduits or manifolds to allow passage of the fuel and oxidant into and byproducts, as well as excess fuel and oxidant, out of the stack. Generally, in certain cell configurations, oxidant is fed to the structure from a manifold located on one side of the stack, while fuel is provided from a manifold located on an adjacent side of the stack. The fuel and oxidant are generally pumped through the manifolds. From the manifolds, the fuel and oxidant are separately introduced to fluid distribution surfaces on an appropriate structure such as an interconnect between cells or an end cap. The fluid distribution surfaces are positioned in fluid communication with the appropriate electrode, with the SOFC efficiency related, in part, to fluid distribution across the surface of the electrode.

What is needed in the art is an enhanced structure for distributing fluid to electrodes of SOFC's, particularly for distributing fuel to anodes of SOFC's.

SUMMARY

The drawbacks and disadvantages of the prior art are overcome by an electrode fluid distributor. The electrode fluid distributor comprises a fluid passageway having a first end with an inlet and a second end with an outlet. A baffle is included that diagonally traverses the fluid passageway from the first end to the second end, and from a base of the fluid passageway toward an at least partially open side of the fluid passageway. The baffle defines at least a portion of a first reservoir and at least a portion of a second reservoir, with the inlet defining at least a portion of one end of the first reservoir and the outlet defining at least a portion of one end of the second reservoir. The inlet is in fluid communication with the outlet over the baffle. The first reservoir has a width proximate the open side which is smaller proximate the inlet than proximate the outlet.

BRIEF DESCRIPTION OF THE DRAWINGS

Referring now to the figures, which are meant to be exemplary not limiting, and wherein like elements are numbered alike in the several figures.

DETAILED DESCRIPTION OF THE PREFERRED EMBODIMENTS

A structure is provided for fluid distribution to an electrode that achieves a balanced concentration along the length of the electrode. This is achieved through a mixture of new and spent fuel in varying quantities along the length of a passageway in fluid communication with the electrode.

Different types of SOFC systems exist, including tubular or planar systems. These various systems, while operating with different cell configurations, have similar functionality. Therefore, reference to a particular cell configuration and components for use within a particular cell configuration are intended to also represent similar components in other cell configurations, where applicable.

Generally, the system may comprise at least one SOFC, an engine, one or more heat exchangers, and optionally, one or more compressors, an exhaust turbine, a catalytic converter, preheating device, plasmatron, electrical source (e.g., battery, capacitor, motor/generator, turbine, and the like, as well as combinations comprising at least one of the foregoing electrical sources), and conventional connections, wiring, control valves, and a multiplicity of electrical loads, including, but not limited to, lights, resistive heaters, blowers, air conditioning compressors, starter motors, traction motors, computer systems, radio/stereo systems, and a multiplicity of sensors and actuators, and the like, as well as conventional components.

Figure 1:
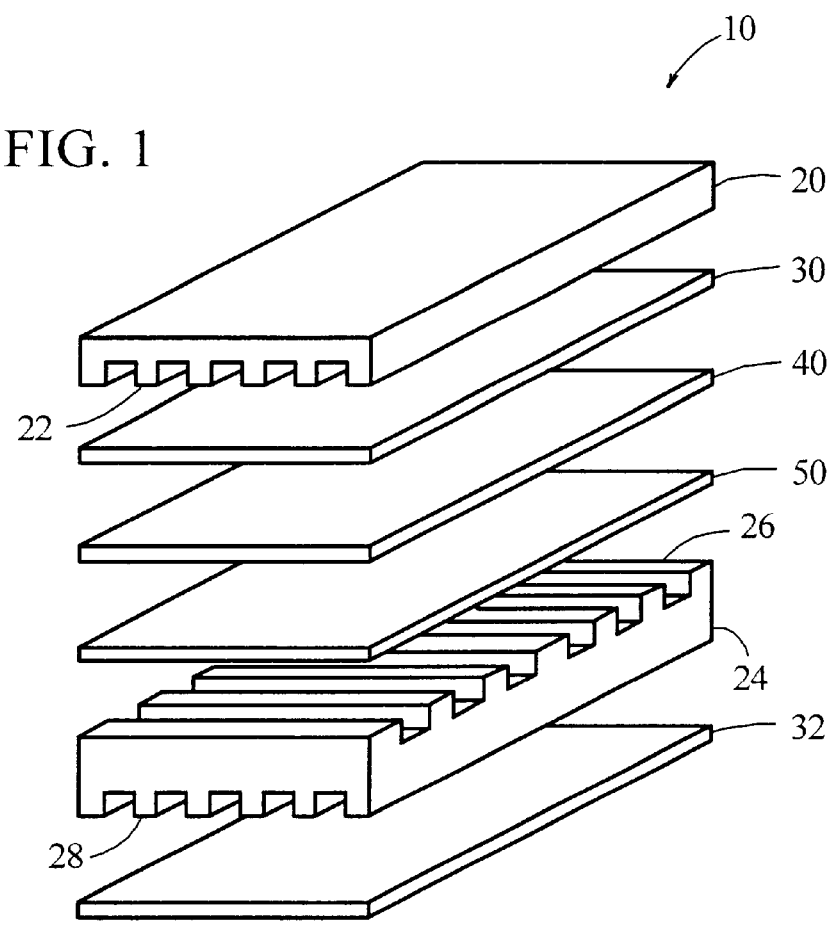
FIG. 1 is an expanded isometric view of a SOFC.

One configuration of a SOFC includes a stack of planar SOFC's. An electrochemical cell stack 10 is illustrated in FIG. 1. A fuel electrode or anode 30 and an oxygen electrode or cathode 50 are disposed on opposite sides of a solid electrolyte 40. An end cap 20 includes a surface 22 that is configured for disposal adjacent to the anode 30 for both electrical contact and also to provide fuel distribution. An interconnect 24 includes a first interconnect surface 26, and a second interconnect surface 28. Surface 26 is configured for disposal adjacent to the cathode 50 to provide oxidant distribution and electrical contact, and surface 28 is configured for disposal adjacent to an anode 32 of another SOFC. Anode 32 is disposed adjacent to interconnect 24 to illustrate the placement of and ability to stack several electrochemical cells connected to electrochemical cell 10.

The solid electrolyte 40 of the electrochemical cell 10 can be an ion conductor capable of transporting oxygen ions from the cathode 50 to the anode 30, that is compatible with the environment in which the SOFC will be utilized (e.g., temperatures of about −40° C. up to about 1,000° C.). Generally, solid electrolyte materials include conventional materials, such as ceramics and/or metals (e.g., alloys, oxides, gallates, and the like), including zirconium, yttrium, calcium, magnesium, aluminum, rare earths, and the like, as well as oxides, gallates, aluminates, combinations, and composites comprising at least one of the foregoing materials. Preferably the electrolyte is a rare earth oxide (such as yttria, gadolinia, neodymia, ytterbia, erbia, ceria, and the like) doped with aliovalent oxide(s) (such as magnesia, calcia, strontia, and the like, and other $^{+2}$ valence metal oxides).

The anode 30 and cathode 50, which form phase boundaries (gas/electrolyte/catalyst particle; commonly known as triple points) with the electrolyte 40, can be disposed adjacent to or integral with the electrolyte 40. The anode 30 and cathode 50 are generally formed of a porous material capable of functioning as an electrical conductor and capable of facilitating the appropriate reactions. The porosity of these materials should be sufficient to enable dual directional flow of gases (e.g., to admit the fuel or oxidant gases and permit exit of the byproduct gases), with a porosity of about 20% to about 40% porous, typically preferred.

The composition of the anode 30 and cathode 50 can comprise elements such as zirconium, yttrium, nickel, manganese, strontium, lanthanum, iron, cobalt, samarium, calcium, proseodynium, and, oxides, alloys, and combinations comprising at least one of the foregoing elements. Preferably, the anode material is formed upon a ceramic skeleton, such as nickel oxide-yttria-stabilized zirconia, and the like, for thermal compatibility.

Either or both the anode 30 and the cathode 50 can be formed on the electrolyte 40 by a variety of techniques including sputtering, chemical vapor deposition, screen printing, spraying, dipping, painting, and stenciling, among others. The electrodes are disposed typically up to about 10 to about 1,000 microns or so in thickness. In the anode supported case, the anode is preferably about 1,000 microns, the electrolyte about 10 microns, and the cathode about 40 microns.

The electrochemical cell 10 can be electrically connected with other electrochemical cells by using for example, interconnect 24. Depending upon the geometry of the SOFC, the fuel and the oxidant flow through the electrochemical cell 10 via the passageways of the end cap 20 and the interconnect 24. The end cap 20 and the interconnect 24 are generally formed of a material capable of withstanding the pressures and temperatures of the SOFC, and capable of conducting electricity. For example, suitable end caps and interconnects can be in the form of mats, fibers (chopped, woven, non-woven, long, and the like) which are capable of withstanding automobile operating conditions (e.g., temperatures of about −40° C. to about 1,000° C.) and are electrically conductive material compatible with the oxidizing or reducing nature of the fuel cell environment. Some possible end caps and interconnects can comprise materials such as silver, copper, ferrous materials, strontium, lanthanum, chromium, chrome, gold, platinum, palladium, nickel, titanium, conducting ceramics (e.g., doped rare earth oxides of chromium, manganese, cobalt, nickel, and the like; doped zirconia, including, zirconia doped with titanium, copper, and the like), and the like, as well as alloys, oxides, cermets, composites, and combinations comprising at least one of the foregoing materials.

Each individual electrochemical cell 10 comprising a single anode 30, a single electrolyte 40, and a single cathode 50, generates a relatively small voltage, generally from about 0.5 to about 1.1 volts. Higher voltages are attained by electrically connecting a plurality of electrochemical cells in series to form a stack. The total number of cells forming a stack can range from 2 to several hundred, depending on power requirements, space and weight restrictions, economics, and the like.

The dimensions of each cell may vary generally depending on the spacial requirements and the desired output. Generally, SOFC's may be employed in areas ranging from a microscopic scale, wherein each cell has an area of several microns squared, to an industrial power generation scale, such as in a power plant wherein each cell has an area of several meters squared. Particularly useful dimensions for SOFC's employed in automotive applications are between 50 and 200 squared centimeters per cell ($cm^2$/cell), but it will be understood that these dimensions may vary depending on various design considerations.

Figure 2:
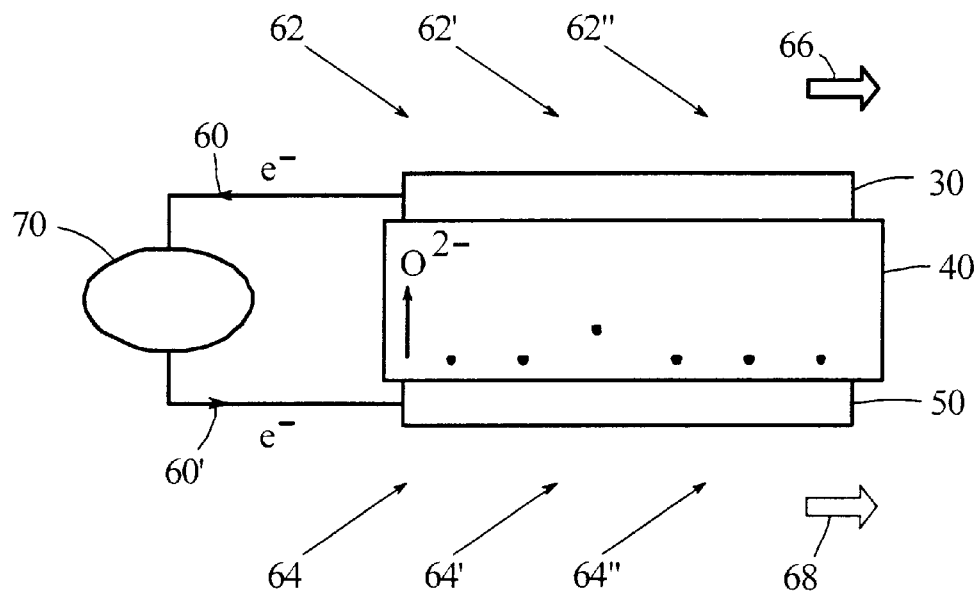
FIG. 2 is a schematic of the operation of a SOFC.

In operation, the electrochemical cell 10 produces a current flow as illustrated by current flow arrows 60, 60' in FIG. 2. Oxidant gases, such as oxygen or air, can be introduced to the cathode side of the cell, flowing as illustrated by the oxidant flow arrows 64, 64', 64". The oxidant receives the flowing electrons (e) and converts them into oxide ions ($O^{2-}$), which diffuse through the electrolyte 40 to the anode 30, as depicted in the following reaction:

$$O_2 + 4e^- \rightarrow 2O^{2-}$$

At the anode, the oxide ions react with a fuel, such as hydrogen, carbon monoxide, methane, other hydrocarbons, or a combination comprising at least one of the foregoing fuels, which is introduced to the electrochemical cell 10 as illustrated by the fuel flow arrows 62, 62', 62". The reaction of the fuel and oxide ions produces electrons ($e^-$), which flow outside of the electrochemical cell 10 to the external circuit 70 and back to the cathode 50. The fuel/oxide ion reaction is depicted in the following reactions:

$$H_2 + O^{2-} \rightarrow H_2O + 2e^- \quad \text{(when fuel is hydrogen)}$$

$$CO + O^{2-} \rightarrow CO_2 + 2e^- \quad \text{(when fuel is carbon monoxide)}$$

$$CH_4 + 4O^{2-} \rightarrow 2H_2O + CO_2 + 8e^- \quad \text{(when fuel is methane)}$$

Unreacted fuel and byproducts, such as water or carbon monoxide, exit the electrochemical cell 10 in the fuel stream, as illustrated by fuel stream arrow 66, while excess oxidant exits the electrochemical cell 10, as illustrated by oxidant stream arrow 68.

Basically, the electrolyte 40 conducts these oxide ions ($O^{-2}$) between the anode 30 and the cathode 50, maintaining an overall electrical charge balance. The cycle of flowing electrons ($e^-$) from the anode 30 through the external circuit 70 to the cathode 50 creates electrical energy for harnessing. This electrical energy can be directly utilized by the vehicle to power various electrical parts, including, but not limited to, lights, resistive heaters, blowers, air conditioning compressors, starter motors, traction motors, computer systems, radio/stereo systems, and a multiplicity of sensors and actuators, among others. Unlike electricity generated in conventional motor vehicles, the electricity produced by the SOFC is direct current which can be matched to the normal system voltage of the vehicle. This minimizes or avoids the need for devices such as diodes, voltage conversion and other losses, such as resistive losses in the wiring and in/out of the battery, associated with conventional vehicle systems and traditional hybrid electrical systems. This high efficiency electricity allows electrification of the vehicle, including functions such as air conditioning and others, while allowing weight, fuel economy and performance advantages compared to conventional hybrid electric mechanization and conventional internal combustion engine systems.

During start-up and for cabin heating the SOFC can be operated at high adiabatic temperatures, e.g. up to about 1,000° C., subject to catalyst limitations, with typical operating temperatures ranging from about 600° C. to about 900° C., and preferably about 650° C. to about 800° C. Consequently, at least one heat exchanger is preferably employed to cool the SOFC effluent and conversely heat the air prior to entering the SOFC, with conventional heat exchangers generally employed.

The fuel utilized in the system is typically chosen based upon the application, and the expense, availability, and environmental issues relating to the fuel. Possible fuels include conventional fuels such as hydrocarbon fuels, including, but not limited to, conventional liquid fuels, such as gasoline, diesel, ethanol, methanol, kerosene, and others; conventional gaseous fuels, such as natural gas, propane, butane, and others; and alternative or "new" fuels, such as hydrogen, biofuels, Fischer Tropch, dimethyl ether, and others; and any combinations comprising at least one of the foregoing fuels. The preferred fuel is typically based upon the type of engine employed, with lighter fuels, i.e. those which can be more readily vaporized and/or conventional fuels which are readily available to consumers, generally preferred.

Furthermore, the fuel for the SOFC can be processed in a reformer. A reformer generally converts one type of fuel to a fuel usable by the SOFC (e.g., hydrogen). Mainly two types of reformer technologies are employed, steam reformers which employ an exothermic reaction and partial oxidation reformers which employ an endothermic reaction. Steam reformer technology is generally employed for converting methanol to hydrogen. Partial oxidation reformers are generally employed for converting gasoline to hydrogen. Typical considerations for the reformers include rapid start, dynamic response time, fuel conversion efficiency, size, and weight.

The SOFC may be used in conjunction with an engine, for example, to produce tractive power for a vehicle. Within the engine, SOFC effluent, air, and/or fuel are burned to produce energy, while the remainder of unburned fuel and reformed fuel is used as fuel in the SOFC. The engine can be any conventional combustion engine including, but not limited to, internal combustion engines such as spark ignited and compression ignited engines, including, but not limited to, variable compression engines.

Similar to the engine, the turbine can be employed to recover energy from the engine effluent to produce tractive power and further to recover energy to operate the compressor(s) and preferably to generate electricity for various uses throughout the system and/or vehicle. The turbine employed can be any conventional turbine useful in automotive or power generation applications. In a preferred embodiment, the turbine and/or compressor may be accelerated or decelerated by a motor/generator to increase the compression (when required to increase the compression for optimal system performance) or to decrease compression (when excessive energy is available in the exhaust gases). For example, a high-speed electrical machine can be linked to the turbine and compressor.

After passing through the turbine, the SOFC effluent preferably enters a catalytic converter in order to attain extremely low, nearly zero emissions of hydrocarbons and nitric oxide. The catalytic converter is typical of those used in automotive applications, including those employing (1) noble metals and alloys thereof, such as platinum, rhodium and palladium catalysts and alloys thereof, among others and/or (2) particulate filtering and destruction.

Optional equipment which additionally may be employed with the present system includes, but is not limited to, sensors and actuators, heat exchangers, a battery, a fuel reformer, a burner, phase change material, a thermal storage system, a plasmatron, a desulfurizer, or any combination comprising at least one of the foregoing equipment. Desulfurizer equipment may also be employed, for example, if the fuel is rich in sulfur, or if the catalyst employed in the SOFC is particularly intolerant to sulfur, such as nickel-based catalysts.

Figure 3:
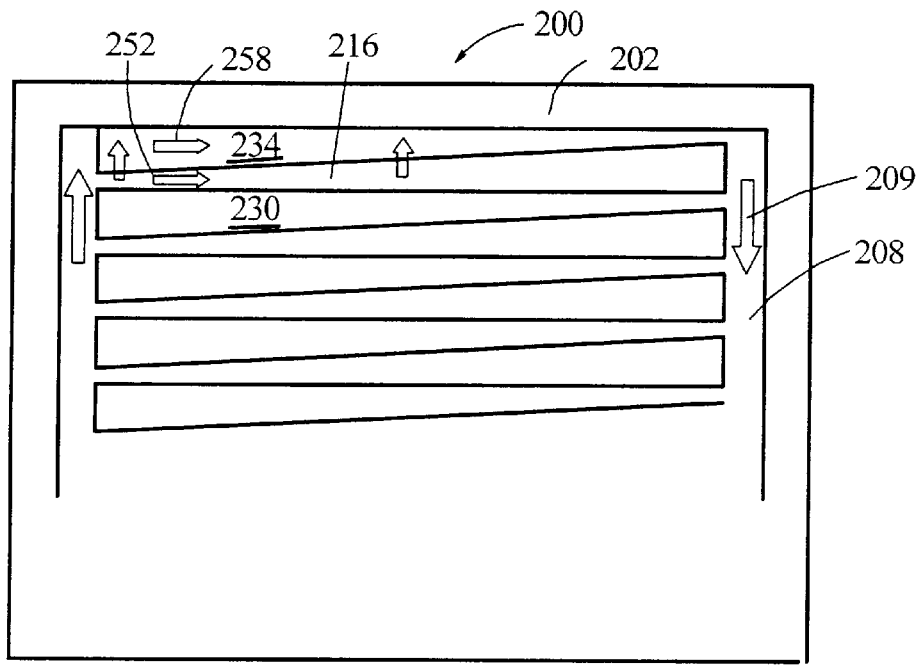
FIG. 3 is a partial plan view of a fluid distribution system according to one embodiment.
Figure 4:
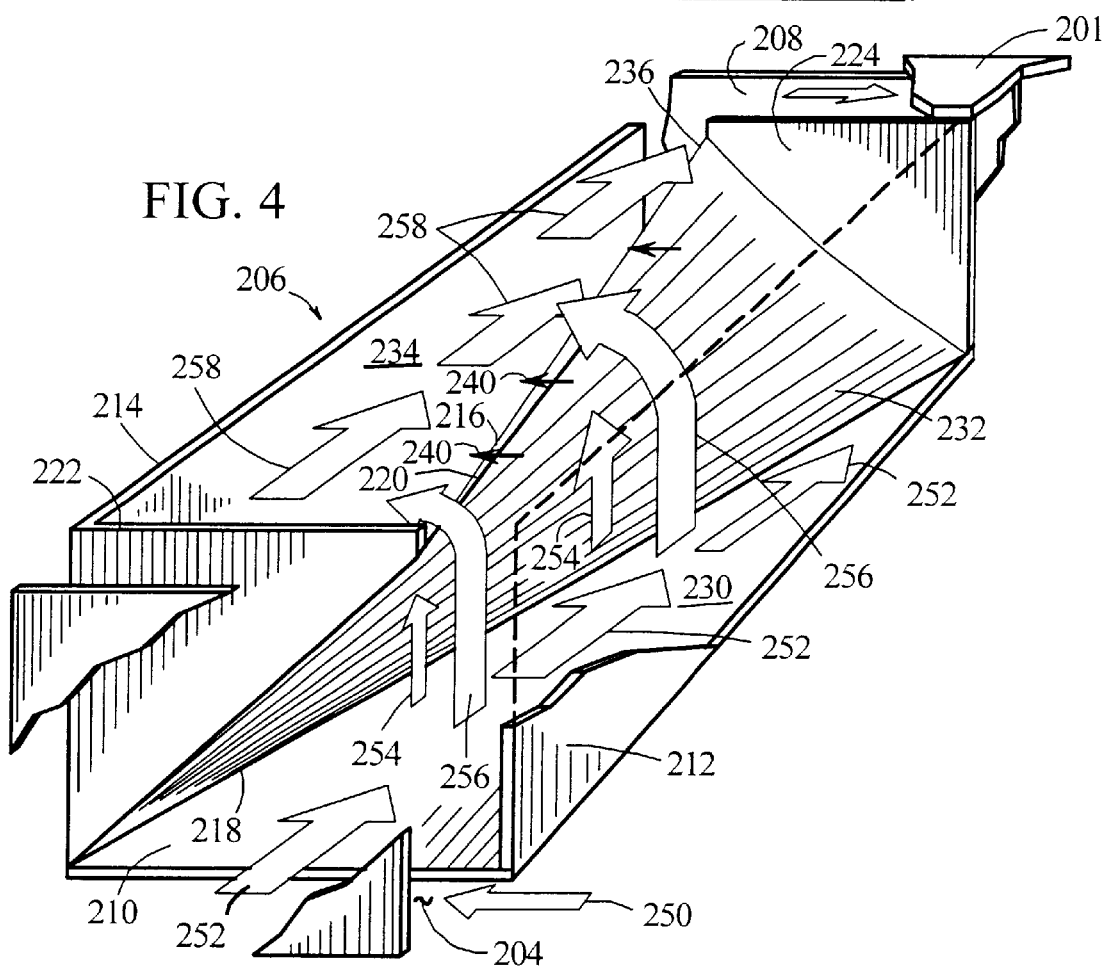
FIG. 4 is an isometric view of a fluid passageway employed within the fluid distribution system of FIG. 3.
Figure 5:
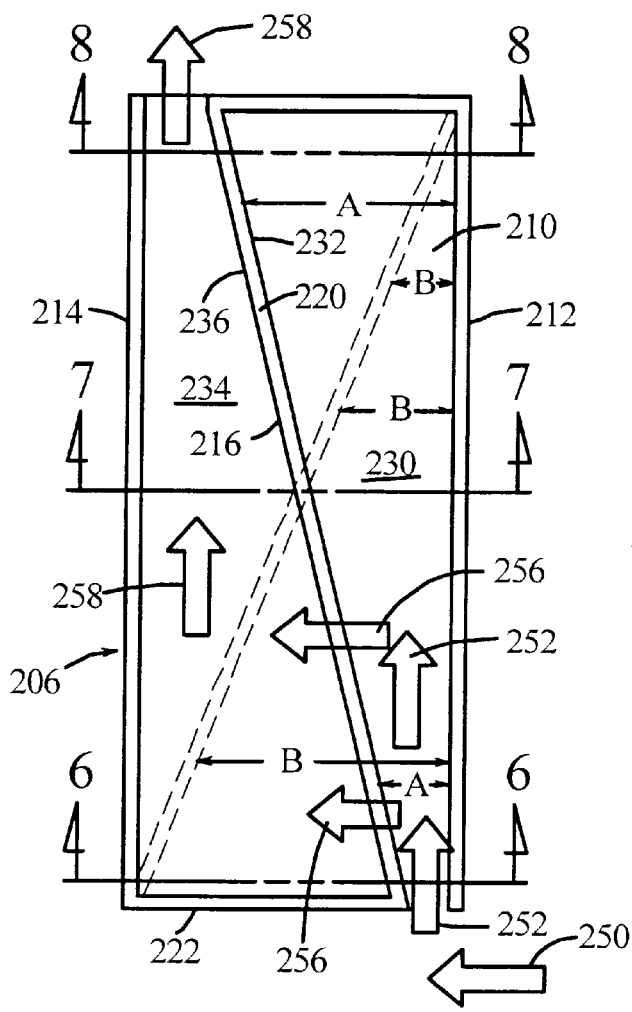
FIG. 5 is a top plan view of the fluid passageway of FIG. 4.
Figure 6:
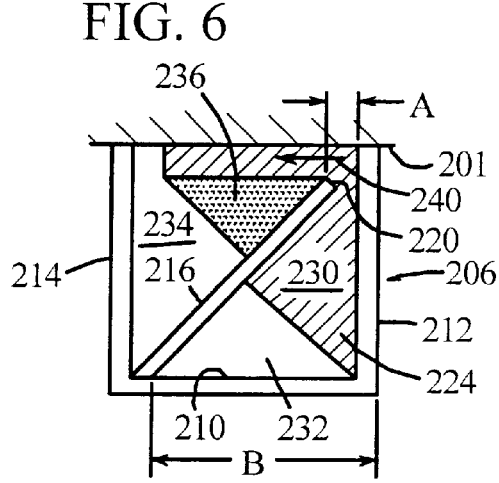
FIG. 6 is a sectional view along lines 6—6 of FIG. 5.
Figure 7:
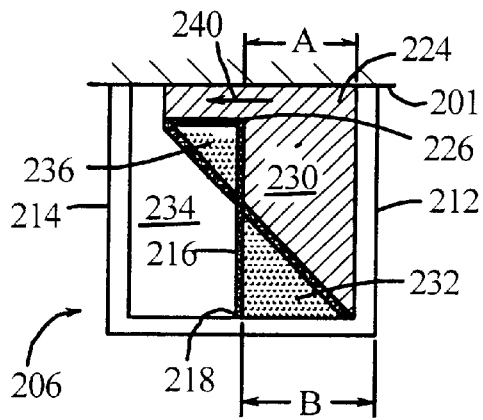
FIG. 7 is a sectional view along lines 7—7 of FIG. 5.
Figure 8:
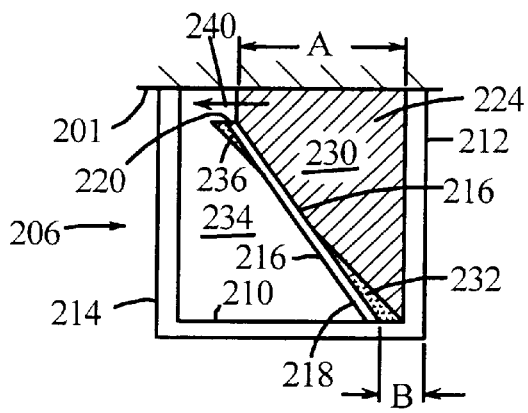
FIG. 8 is a sectional view along lines 8—8 of FIG. 5.

FIG. 3 is a plan view of a fluid distribution surface 202 of a structure 200, for example, suitable for use as a portion of end cap 20 or interconnect 24 described above. Surface 202 comprises a plurality of fluid passageways 206 formed therein generally for balanced fuel distribution to the electrode. In particular, a fluid inlet 204 is in fluid communication with a fluid source (not shown). The plurality of fluid passageways 206 extend across surface 202 to an outlet 208.

Although reference is made herein to a plurality of fluid passageways 206, it is contemplated that a single fluid passageway 206 can be employed as a portion of a fluid distribution system comprising fluid distribution systems other than the fluid passageway 206. Alternatively, a single fluid passageway 206 may be employed with a cell having suitable dimensions. Furthermore, a plurality of fluid passageways 206 may comprise a portion of a fluid distribution system.

At the anode, the fuel initially having a flux in the direction indicated by arrow 250 is introduced through the fluid passageways 206. The fuel reacts with oxide ions to produce electrons and water, as described above with respect to FIG. 2. Unreacted fuel and resultant water (having a flux generally in the direction indicated by arrow 209) exit the cell at the outlet As fuel is reacted on the anode from the inlet 204 across the fluid passageways 206 toward the outlet 208, the concentration of fuel depletes within the overall fuel stream. The fuel stream generally comprises unreacted fuel and resultant water, wherein the water enters the fuel stream after fuel reaction at the anode. To enhance balanced fuel distribution across the surface of the electrode, the fluid passageways 206 are configured to initially distribute a smaller quantity of a high concentration fuel stream (e.g., containing a high fuel concentration and little resultant water) and as the concentration of fuel depletes over the surface of the electrode, distribute a larger quantity of a lower concentration fuel stream (e.g., containing unreacted fuel and resultant water).

Referring now also to FIGS. 4–8, the fluid passageway 206 which is capable of achieving the balanced distribution is detailed. The fluid passageway 206 is generally configured as a hexahedron or box-like shape having an open portion configured to expose fluids to an adjacent surface such as the anode face 201 (shown by phantom lines at the top of the fluid passageway 206 as oriented in FIG. 4). The fluid passageway 206 further includes a side 210 opposite the open portion configured to expose fluids to an electrode, and a pair of walls 212 and 214 extending from the side 210. A traverse baffle 216 is also provided which traverses fluid passageway 206 and comprises a base edge 218 that extends from side 210 toward the open portion of fluid passageway 206, e.g., proximate to the anode 201, and further comprises a terminal edge 220. Preferably, baffle 216 is positioned a suitable distance from the anode 201. The fluid passageway 206 further includes an end baffle 222 proximate to the fuel inlet 204, and an end baffle 224 proximate to the outlet 208 (see FIG. 3).

Typically an electrical contact area of at least about 5%, with at least about 10% preferred and about 10% to about 25% especially preferred, based upon the area of anode 201. The electrical contact is generally via the edges of walls 212, 214, and baffles 222, 223.

The dimensions of the fluid passageway 206 can vary depending on factor including, but not limited to the available space, the degree of variation tolerable across a surface of an electrode having fluid fed from fluid passageway 206, desired flow economy, and available manufacturing techniques, among others. In a cell having a surface area of 100 cm$^2$, for example, the height of the fluid passageway 206 (i.e., the height of wall 212 or al 214) is generally about 0.1 millimeters (mm) to about 5 mm, preferably about 0.1 mm to; about 4 mm, and more preferably about 0.2 mm to about 1 mm. The width (i.e., distance between the wall 212 and 214) of fluid passageway 206 (e.g., for a cell having a surface area of about 100 cm$^2$) is generally about 0.1 mm to about 5 mm, preferably about 0.1 mm to about 4 mm; and more preferably about 0.2 mm to about 1 mm. Additionally, the length of fluid passageway 206 can vary from approximately the length of the cell (e.g., in the direction that fluid passageway 206 is oriented) to any portion of the length of the cell. Alternatively, where the longitudinal orientation is curved, jagged, bent, concentric, spiral, or other non-linear orientation, the length of the fluid passageway 206 maybe greater than the length of any portion of the surface 202.

A first reservoir 230 is defined within the fluid passageway 206 bound by a surface 232 of traverse baffle 216, side 210, end baffle 224, and wall 212. Fluid is routed into the first reservoir 230 from the inlet 204. Further, a second reservoir 234 is defined within the fluid passageway 206 bound by a surface 236 of traverse baffle 216, side 210, end baffle 222, and wall 214.

The baffle 216 is configured to enhance fluid distribution across the anode 201, thereby enabling substantially uniform fuel access across the anode 201 despite decreasing fuel concentration Basically, near the fuel intake 204, a relatively small quantity of the fluid stream contacts the anode 201, i.e., when the fuel concentration is at a maximum. As t ie fluid stream traverses the fluid passageway 206, a greater percentage of the fluid stream has access to the anode 201 until, proximate the outlet 208, the largest percentage of the fluid stream can access the anode, ie., when the fuel concentration is at a minimum.

In one embodiment, the baffle 216 is canted (e.g., such that the traverse baffle 216 is twisted across the length of the fluid passageway 206) to provide a continuous variation along the long axis of the fluid passageway 206. The continuous variation results in varying widths of direct anode contact while maintaining a constant cross-sectional area of the reservoirs 230, 234 along the length of fluid passageway 204. In alternative embodiments, the angle of the traverse baffle 216 may vary in discreet sections (not shown) such that a series of discreetly dimensioned direct anode contact surfaces are attained along the long axis of fluid passageway 206.

By canting baffle 216, first reservoir 230 is characterized by: a width "A", being the distance between baffle 216 and wall 212 proximate to the open portion (i.e., adjacent to the electrode in an assembled state); and a width "B", being the distance between baffle 216 and wall 212 proximate to side 210. Width "A" varies generally from about 1% to about 99% of the total width of the fluid passageway 206, preferably, about 5% to about 95% of the total width of the fluid passageway 206, and more preferably about 10% to about 90% of the width of the fluid passageway 206. Further, the variation in width "A" may be at a constant rate across the length of surface 202, or alternatively, the rate of change may vary. Additionally, width "B" varies generally from about 90% to about 10% of the total width of the fluid passageway 206, preferably, about 95% to about 5% of the total width of the fluid passageway 206, and more preferably about 100% to about 0% of the width of the fluid passageway 206. Note that proximate the mid-point between the inlet and the outlet, width "A" and width "B" are both about 50% of the total width of the fluid passageway, consistent with the twisted configuration. Further, as in width "A", the variation in width "B" may be at a constant rate across the length of surface 202, or alternatively, the rate of change may vary.

A canted embodiment of fluid passageway 206, as shown in FIGS. 4–8, provides consistently distributed fuel despite fuel concentration depletion in the flux across fluid passageway 206. The base edge 218 extends generally along the side 210 from the intersection of the side 210, the wall 212, and the end baffle 224, to the intersection of the side 210, the wall 214, and the end baffle 222. However, it is understood that at least a portion of the base edge 218 may be formed on any suitable portion of the fluid passageway 206, including but not limited to the wall 212, the wall 214, the end baffle 222, the end baffle 224, or any combination of the foregoing portions of the fluid passageway 206.

The traverse baffle 216 is shaped such that the terminal edge 220 extends proximate to the anode 201 generally from the end baffle 222 proximate the wall 212 to the end baffle 224 proximate the wall 214. The space between the terminal edge 220 and the anode 201 creates a cross flow path 240. The dimensions of the space between the terminal edge 220 and the anode 201 may remain constant or vary along the length of the fluid passageway 206. Preferably, the terminal edge 220 does not contact the anode 201, such that the cross flow path 240 is available generally along th length of the fluid passageway 206. The dimensions of the spaces between the terminal edge 220 and the surface of the anode 201 is generally about 0.01 mm to about 2 mm, preferably about 0.1 mm to about 1 mm, and more preferably about 0.2 mm to about 0.8 mm The configuration of the traverse baffle 216 is such that the angle between the traverse baffle 216 and the side 210 varies. The angle may range generally about 30 degrees to about 55 degrees, preferably about 35 degrees to about 55 degrees, and more preferably about 40 degrees to about 50 degrees. For example, in one embodiment a cell is configured such that the rate of change of the angle between the traverse baffle 216 and the side 210 along the length of each fluid passageways 206 is about 65 to 115 degrees over the total length of the fluid passageway 206.

The surface 202 including the fluid passageways 206 may be formed by various techniques, including but not limited to, machining, casting, molding, milling, chemical etching, and the like, as well as any combination comprising at least one of the foregoing techniques.

In a method of operation according to one embodiment, a fuel stream is introduced into the fluid passageway 206, for example, via the inlet 204, initially having a flux in the direction indicated by arrow 250. Fuel enters the fluid passageway 206 through the first reservoir 230 having a flux generally in the direction indicated by arrows 252, and is generally prevented from flowing directly into the second reservoir 234 by the end baffle 222. A portion of the fuel within the fuel stream having a flux generally in the direction indicated by arrows 254 (FIG. 4) contacts the anode 201 and reacts as detailed above to form water and electrons, wherein at least a portion of the resultant water accumulates in the fuel stream. A portion of the fuel stream having a flux generally in the direction indicated by arrows 256 crosses into the second reservoir 234, wherein at least some of the fuel from that portion reacts at the anode. Accumulated water and the unreacted fuel exit the fluid passageway 206 in the direction of arrows 258 in the outlet 208.

As the fuel stream traverses the fluid passageway 206, fuel in the fuel stream is depleted due to fuel reaction at the anode and dilution of the fuel stream with reaction product. Generally, the inclusion of the traverse baffle 216 forms a variation in the dimension of the interface between the fuel stream and the anode along the fluid passageway 206 in the direction of fuel stream flow, and a variation in the cross sectional area of flow. Due to the dimensional variation (at the anode surface, in the reservoirs, or both at the anode surface and in the reservoirs) the variation in the concentration of fuel in the fuel stream is compensated.

Further, the velocities of the fuel stream are varied due to the variation of the cross section of the reservoirs. Where the reservoir cross-section varies (e.g., those embodiments where the traverse baffle 216 is not canted), the fuel stream generally has a higher velocity at the inlet since the cross section of the first reservoir 230 may be small near the inlet (as compared to near the outlet). As a result, where the reservoir cross-section varies and thus the velocities vary, the high fuel concentration fuel stream has a smaller residency time at the anode surfaces where the velocity is high. Therefore, as the cross sectional area of the first reservoir 230 increases in the direction of fluid transport, the velocity decreases, and the residency time increases. However, the regions of lower concentration and the regions of higher concentration taken together result in generally constant reaction completion. Consequently, power, per unit area remains relatively constant despite the increased residency time and the increased area of electrode contact, since the fuel concentration in the fuel stream is depleted by usage and dilution.

Correspondingly, the fuel stream in the second reservoir 234 comprises a spent fuel steam from the first reservoir 230. Proximate the inlet, the fuel stream in the second reservoir 234 has a high concentration (since it is the flow from the high concentration flow from the inlet into the first reservoir 230). The fuel stream has a lower velocity (and a resulting higher residency time) proximate the inlet as compared to proximate the outlet in embodiments where the cross-sectional area decreases in the direction of flux. The quantity of fluid in the fuel stream in the second reservoir 234 (including fuel and water) generally increases in the direction of flux, since the spent fuel stream includes all of the fuel and water from the previous regions of the second reservoir 234 and additional spent fuel from the first reservoir 230.

Figure 9:
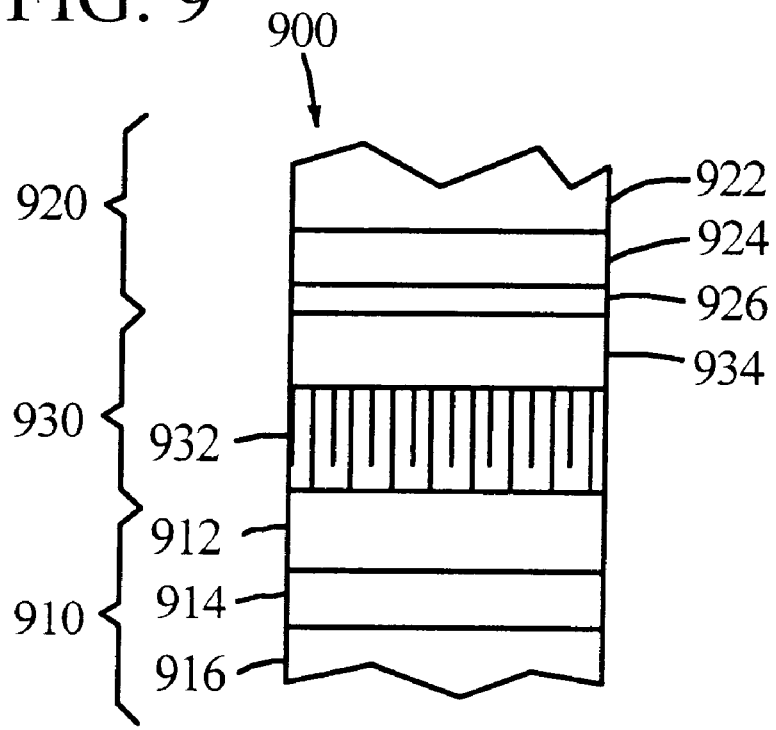
FIG. 9 is a schematic of a SOFC system incorporating the fluid distribution system.

Referring now to FIG. 9, a cell system 900 is provided. A portion 932 comprises a surface similar to surface 202 described above. Portion 932 is at least partially ii fluid communication with an anode 912 of a first cell 910. The first cell 910 comprises the anode 912, an electrolyte 914, and a cathode 916. The interconnect 930 comprises portion 932 on one side thereof, and another portion 934 on the opposite side of interconnect 930. At least a portion of portion 934 is at least partially in fluid communication with a cathode 926 of a second cell 920. Second cell 920 comprises cathode 926, an anode 922, and an electrolyte 924.

Figure 10:
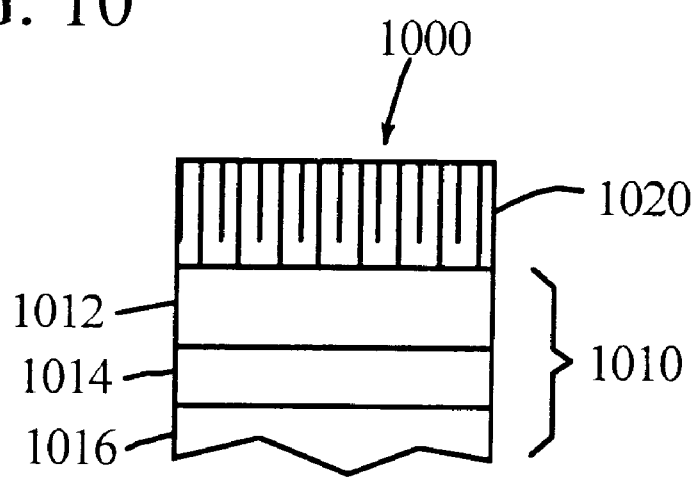
FIG. 10 is a schematic of another SOFC system incorporating the fluid distribution system.

In another embodiment, and referring now to FIG. 10, a cell system 1000 comprises an end cap 1020. End cap 1020 may be used adjacent to a first cell in a stack. At least a portion of end cap 1020 is at least in partially in fluid communication with an anode 1012 of a cell 1010. Cell 1010 comprises the anode 1012, an electrolyte 1014, and a cathode 1016.

The benefits of the fluid distribution surfaces comprise regulation of fuel distribution to, preferably, attain a substantially uniform fuel usage across the anode. Regulation includes increasing the quantity and uniformity of the fuel distribution across the surface of the electrode. Substantially uniform fuel distribution results in higher cell output, decreased fuel waste, capability to produce smaller cells, improved durability through decreased thermal gradient, decreased effort requirement for thermal management, among other benefits. Preferably, the difference in fuel usage across the anode is less than about 20%, with less than 10% preferably, less than 5% more preferred, and less than about 3% especially preferred.

While preferred embodiments have been shown and described, various modifications and substitutions may be made thereto without departing from the spirit and scope of the invention. Accordingly, it is to be understood that the apparatus and method have been described by way of illustration only, and such illustrations and embodiments as have been disclosed herein are not to be construed as limiting to the claims.

What is claimed is:

1. An electrode fluid distributor, comprising:

a fluid passageway having a first end with an inlet, a second end with an outlet, with a baffle diagonally traversing the fluid passageway from the first end to the second end and from a base of the fluid passageway toward an at least partially open side of the fluid passageway, and defining at least a fist portion of a first reservoir and at least a second portion of a second reservoir, with the inlet defining at least the first portion of the first reservoir and the outlet defining at least the second portion of the second reservoir, wherein the inlet is in fluid communication with the outlet over the baffle, and wherein the first reservoir has a width proximate the open side which is smaller proximate the inlet than proximate the outlet.

2. The electrode fluid distributor as in claim 1, further wherein the first reservoir has a width proximate the base which is smaller proximate the inlet than proximate the outlet.

3. The electrode fluid distributor as in claim 1, the fluid passageway having a width, wherein the first reservoir has a width proximate the open side which is less than about 10% of the width of the fluid passageway proximate the inlet and which is greater than about 90% than proximate the outlet.

4. The electrode fluid distributor as in claim 1, the fluid passageway having a width, wherein the first reservoir has a width proximate the base which is less than about 10% of the width of the fluid passageway proximate the outlet and which is greater than about 90% than proximate the inlet.

5. The electrode fluid distributor as in claim 1, wherein said baffle has a dimension in a direction from the base to the open portion that is constant along the length of the fluid passageway.

6. The electrode fluid distributor as in claim 1, wherein said baffle has a dimension in a direction from the base to the open portion that varies along the length of the fluid passageway.

7. The electrode fluid distributor as in claim 1, the fluid passageway having a width, wherein the fist reservoir has a first width proximate the open side, the first width is less than about 10% of the width of the fluid passageway proximate the inlet and is greater than about 90% than proximate the outlet, flier wherein the first width, proximate the base is less than about 10% of the width of the fluid passageway proximate the outlet and is greater than about 90% than proximate the inlet, and further wherein the first width is about 50% of the width of the fluid passageway proximate a midpoint between the inlet and the outlet, such that the baffle is twisted between the inlet and the outlet.

8. A solid oxide fuel cell stack comprising:

a first cell having an anode;

a second cell having a cathode;

an electrode fluid distributor, comprising a first surface in electrical contact with the anode of the first cell and in fluid communication with the anode of the first cell the first surface including a fluid passageway having a first end with an inlet, a second end with X outlet, with a baffle diagonally traversing the fluid passageway from the first end to the second; end and from a base of the fluid passageway toward an at least partially open side of the fluid passageway, and defining at least a first portion of a first reservoir and at least a second portion of a second reservoir, with the inlet defining at least the first portion of the first reservoir and the outlet defining at least the second portion of the second reservoir; wherein the inlet is in fluid communication with the outlet over the baffle, and wherein the first reservoir has a width proximate the, open side which is smaller proximate the inlet than proximate the outlet.

9. The solid oxide fuel cell of claim 8, further wherein the first reservoir has a width proximate the base which is smaller proximate the inlet than proximate the outlet.

10. The solid oxide fuel cell of claim 8, the fluid passageway having a width, wherein the first reservoir has a width proximate the open side which is less than about 10% of the width of the fluid passageway proximate the inlet and which is greater than about 90% than proximate the outlet.

11. The solid oxide fuel cell of claim 8, the fluid passageway having a width, wherein the first reservoir has a width proximate the open side which is less than about 5% of the width of the fluid passageway proximate the inlet and which is greater than about 95% than proximate the outlet.

12. The solid oxide fuel cell of claim 8, the fluid passageway having a width, wherein the first reservoir has a width proximate the open side which is less than about 1% of the width of the fluid passageway proximate the inlet and which is greater than about 99% than proximate the outlet.

13. The solid oxide fuel cell of claim 8, the fluid passageway having a width, wherein the first reservoir has a width proximate the base which is less than about 10% of the width of the fluid passageway proximate the outlet and which is greater than about 90% than proximate the inlet.

14. The solid oxide fuel cell of claim 8, the fluid passageway having a width, wherein the first reservoir has a width proximate the base which is less than about 5% of the width of the fluid passageway proximate the outlet and which is greater than about 95% than proximate the inlet.

15. The solid oxide fuel cell of claim 8, the fluid passageway having a width, wherein the first reservoir has a width proximate the base which is less than about 10% of the width of the fluid passageway proximate the inlet and which is greater than about 90% than proximate the outlet.

16. The solid oxide fuel cell of claim 8, wherein said baffle has a dimension in a direction from the base to the open portion that is constant along the length of the fluid passageway.

17. The solid oxide fuel cell of claim 8, wherein said baffle has a dimension in a direction from the base to the open portion that varies along the length of the fluid passageway.

18. The solid oxide fuel cell of claim 8, further comprising a second surface configured for fluid communication and electrical contact with the cathode of the second cell.

* * * * *